US008874796B1

(12) United States Patent
Bell et al.

(10) Patent No.: US 8,874,796 B1
(45) Date of Patent: *Oct. 28, 2014

(54) TECHNIQUES FOR USING A GENERAL QUERY TO CIRCUMVENT SPECIFIC QUERY RESPONSE FAILURE IN AN IGMP SYSTEM

(75) Inventors: Jared Lee Bell, Madison, AL (US); Neil M. Jensen, Madison, AL (US); Jonathan T. Pardeck, St. Louis, MO (US)

(73) Assignee: Adtran, Inc., Huntsville, AL (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/947,560

(22) Filed: Nov. 29, 2007

Related U.S. Application Data

(60) Provisional application No. 60/867,639, filed on Nov. 29, 2006.

(51) Int. Cl.
*G06F 15/16* (2006.01)
*G06F 15/173* (2006.01)

(52) U.S. Cl.
USPC ........... 709/250; 709/203; 709/217; 709/218; 709/219; 709/223; 709/224; 709/225; 709/226; 709/227; 709/228; 709/231; 709/249

(58) Field of Classification Search
USPC ................. 709/203, 217–219, 223–228, 231, 709/249–250
See application file for complete search history.

(56) References Cited

U.S. PATENT DOCUMENTS

| | | | |
|---|---|---|---|
| 5,029,333 A * | 7/1991 | Graves et al. ................. | 370/490 |
| 5,732,351 A * | 3/1998 | Olds et al. ..................... | 455/436 |
| 6,049,823 A * | 4/2000 | Hwang ........................... | 725/82 |
| 6,272,150 B1 * | 8/2001 | Hrastar et al. ................. | 370/486 |
| 6,381,228 B1 * | 4/2002 | Prieto et al. .................... | 370/323 |
| 6,452,924 B1 * | 9/2002 | Golden et al. ................. | 370/352 |
| 6,691,312 B1 | 2/2004 | Sen et al. ......................... | 725/96 |
| 6,763,019 B2 * | 7/2004 | Mehta et al. .................. | 370/352 |
| 6,781,999 B2 * | 8/2004 | Eyuboglu et al. ............. | 370/399 |
| 7,024,677 B1 | 4/2006 | Snyder et al. .................... | 725/86 |
| 7,030,930 B2 * | 4/2006 | Kovacevic ...................... | 348/515 |
| 7,065,577 B1 * | 6/2006 | Keller-Tuberg ............... | 709/227 |
| 7,228,356 B2 * | 6/2007 | Nguyen et al. ................ | 709/231 |
| 7,243,123 B1 * | 7/2007 | Allen et al. .................... | 709/204 |
| 7,272,652 B1 * | 9/2007 | Keller-Tuberg ............... | 709/227 |
| 7,296,091 B1 | 11/2007 | Dutta et al. .................... | 709/245 |
| 7,600,120 B2 * | 10/2009 | Monteiro et al. ............. | 713/168 |
| 7,606,228 B2 * | 10/2009 | Park et al. ...................... | 370/390 |
| 7,646,713 B1 * | 1/2010 | Absillis et al. ............. | 370/230.1 |
| 7,672,325 B2 * | 3/2010 | Storry et al. ................... | 370/412 |
| 7,697,547 B2 * | 4/2010 | Diouf et al. ................... | 370/399 |
| 7,864,686 B2 * | 1/2011 | Chapman et al. ............. | 370/237 |
| 7,913,283 B2 * | 3/2011 | White et al. .................... | 725/94 |
| 7,933,291 B2 * | 4/2011 | Wormer et al. ............... | 370/466 |
| 8,121,124 B2 * | 2/2012 | Baykal et al. ................. | 370/390 |
| 2003/0108048 A1 * | 6/2003 | Kwok et al. ............... | 370/395.6 |
| 2004/0090970 A1 * | 5/2004 | Sanchez et al. .............. | 370/397 |

(Continued)

*Primary Examiner* — Tauqir Hussain
*Assistant Examiner* — Angela Widhalm
(74) *Attorney, Agent, or Firm* — Fish & Richardson P.C.

(57) ABSTRACT

Flexibility of handling of multicast information using an Internet Group Management Protocol (IGMP) is improved by overcoming failures to respond to group specific queries. Such failures occur when heterogenous host devices are used on a common network. When a failure to respond to a group specific query is experienced, a general query is used to obtain information that was not provided by the group specific query.

17 Claims, 7 Drawing Sheets

(56) References Cited

U.S. PATENT DOCUMENTS

| | | |
|---|---|---|
| 2006/0074968 A1* | 4/2006 | Gyetko .................... 707/102 |
| 2006/0126626 A1* | 6/2006 | Wong et al. ................ 370/390 |
| 2006/0174276 A1* | 8/2006 | Derrenberger et al. ......... 725/46 |
| 2007/0047545 A1* | 3/2007 | Bou-Diab et al. ............ 370/390 |
| 2007/0185724 A1* | 8/2007 | Moel ........................ 705/1 |
| 2008/0060026 A1* | 3/2008 | Cheung et al. ............... 725/81 |
| 2008/0068990 A1* | 3/2008 | Wu .......................... 370/229 |
| 2008/0112324 A1* | 5/2008 | Li et al. .................... 370/235 |
| 2008/0127271 A1* | 5/2008 | Zriny et al. ................. 725/46 |
| 2009/0245393 A1* | 10/2009 | Stein et al. ............. 375/240.28 |
| 2012/0282959 A1* | 11/2012 | Abraham et al. ............. 455/500 |

* cited by examiner

START CHANNEL HOST LIST

| CHANNEL | HOST LIST |
|---|---|
| 1 | |
| 2 | 7, 24, 32 |
| . | |
| . | |
| 15 | 28 |
| . | |
| 18 | |
| . | |
| N | |

FIGURE 5A

Host 24 changes to channel 15 from channel 2

| CHANNEL | HOST LIST |
|---|---|
| 1 | |
| 2 | 7, 32 |
| . | |
| . | |
| 15 | 24, 28 |
| . | |
| 18 | |
| . | |
| N | |

FIGURE 5B

TECHNIQUES FOR USING A GENERAL QUERY TO CIRCUMVENT SPECIFIC QUERY RESPONSE FAILURE IN AN IGMP SYSTEM

CROSS REFERENCE TO RELATED APPLICATIONS

This application claims priority from provisional application No. 60/867,639 filed Nov. 29, 2006, entitled Use of General Channel Usage Query to Circumvent Response Failure to Specific Channel Usage Query in IGMP System of which is hereby incorporated herein in its entirety for all purposes.

BACKGROUND OF THE INVENTION

1. Field of the Invention

The invention relates to digital communication networks and systems and, more particularly to techniques for controlling the operation of an upstream Internet Group Management Protocol (IGMP) router or proxy, such as a digital subscriber line access multiplexer (DSLAM) that delivers multicast traffic to a network port or interface serving a plurality of IGMP hosts such as set top boxes.

2. Description of the Prior Art

Streaming real-time multimedia content can now be provided over the Internet. Streaming applications may include IP telephony, broadcasting multimedia content and multi-party conferences, collaborations and multi-player games. Many of the existing streaming systems do not scale to large audiences, particularly for a transmission at high bit rates. They also do not provide user flexibility, and are restricted to a utilization of either conferencing or broadcast modes.

Early attempts to provide streaming applications to clients over the Internet have been implement using a unicast scheme. An exemplary system illustrating the system which utilizes the conventional unicast architecture is shown in FIG. 1. Referring to FIG. 1, a source (e.g., the audio and/or video content provider) is connected to a first router R1, which in turn is connected to second and third routers R2, R3. The second router R2 is connected to fourth and fifth routers R4, R5, while the third router R3 is connected to sixth and seventh routers R6, R7. The fourth router R4 is connected to two clients C0, C1; the fifth router R5 is connected to three clients C2, C3, C4; the sixth client R6 is connected to two clients C5, C6; and the seventh client R7 is connected to another three clients C7, C8, C9. The clients C0-C9 may be computers requesting the particular multimedia content (e.g., an audio and/or video program).

In operation, if each of the clients C0-C9 requests the same multimedia content, each of those requests is routed via their respective routers to the source. For example, the clients C0, C1 each send a request to the fourth router R4 which routes a request for two streams for the particular multimedia content, i.e., one stream for each of its requesting clients C0, C1 to router R2. At the same time, the fifth, sixth and seventh routers R5, R6, R7 may receive the requests for the same multimedia content from its respective clients C2-C9, and these routers R5, R6, R7 route their streams, respectively, for such multimedia content upstream. The requests for two and three identical multimedia streams (i.e., a total of five streams) are sent to the second router R2 from the fourth and fifth routers R4, R5, respectively. The requests for the same three and two multimedia streams (i.e., also a total of five streams) are sent to the third router R3 from the sixth and seventh routers R6, R7, respectively. The second and third routers R2, R3 each route the request for five multimedia streams to the first router R1, which routes a request for 10 multimedia streams (i.e., 5 for the second router R2 and 5 for the third router R3) to the source.

Thus, the source receives a request for 10 multimedia streams, and then transmits 10 multimedia streams to the first router R1, which then routes the requested 5 identical multimedia streams to the second router R2, and the same 5 multimedia streams to the third router R3. The second router R2 then routes two of these multimedia streams to the fourth router R4, and three to the fifth router R5. The fourth router R4 routes 1 stream to the client C0 and the other stream to the client C1. The fifth router R5 routes one of its received streams to the respective client, C2, C3, C4. Similar routing of the multimedia streams occurs for the third router R3 (and thus for the sixth and seventh routers, (R6, R7).

By utilizing the unicast scheme described above and shown in FIG. 1, there may be multiple copies of the same multimedia content being transmitted from the source down to the clients. Such transmission of multiple streams may cause a bottleneck in the network, waste network bandwidth, and could prevent the clients from receiving the multimedia content in an expeditious manner.

FIG. 2 shows an arrangement utilizing a conventional multicast communications scheme which addresses at least some of the above-mentioned drawbacks. For the sake of simplicity, the multicast arrangement in FIG. 2 is substantially similar to that shown in FIG. 1. Using the multicasting communications scheme illustrated in FIG. 2, if each of the clients C0-C9 requests the same multimedia content, the routers keep track of the particular client which made the request, and only sends one request for the multimedia stream upstream to the next router in the chain (or to the source 100). For example, the clients C0, C1 may send such request (e.g., a join request) to the fourth router R4, which stores an indication (e.g., a state) therein that at least one of clients C0, C1 sent the particular request. At the same time, the fifth, sixth and seventh routers R5, R6, R7 may receive the requests for the same multimedia content from its respective clients C2-C9, and each these routers R5, R6, R7 stores an indication therein regarding that at least one of their respective clients sent the request for multimedia stream. If the fourth router R4 (or the fifth router R5) already routed the multimedia streams to one of its clients (on the same subnet as the requesting client), it routes the multimedia streams to such requesting client. Otherwise each of the fourth and fifth routers R4, R5 sends a request to receive the multimedia stream that was requested by their respective clients C0-C4 to the second router R2. The second router R2 stores an indication that at least one of the fourth and fifth routers R4, R5 made the request. Each of the sixth and seventh routers R6, R7 also may send a request for the multimedia stream (i.e., that was requested by their respective clients C5-C9) to the third router R3. The third router R3 stores an indication which is similar to the one stored in the second router R2. Then, the second and third routers R2, R3 each send the request for the same multimedia stream to the first router R1, which stores an indication regarding which of the routers R2, R3 made the request. Since the first router R1 is directly connected (or connected in the same subnet) to the source, the first router R1 always receives the multimedia stream from the source.

In this manner, the first router R1 receives the request, duplicates the received multimedia stream and transmits 1 copy thereof to each of the second and third routers R2, R3 (if both made the request). The second router R2 then duplicates the received multimedia stream provided in the multicast channels 500, and sends one copy of the stream to each of the fourth and fifth router R4, R5. The fourth router R4, in turn, provides one copy of the received multimedia stream provided in the multicast channels 500 to the client C0 and the other copy to the client C1 (if both made the request).

If two requesting clients are on the same subnet, it is possible for only 1 copy to be broadcast on the subnet for reception by any requesting client. The fifth router R5 duplicates the received multimedia stream, and sends one copy of the received multimedia stream provided by the multicast channels 500 to each of the respective client C2, C3, C4 (if each of theses clients made the request). A similar transmission of the multimedia streams occurs for the third router R3 (and thus for the sixth and seventh routers R6, R7).

With this multicast scheme, the source needs to only transmit one multimedia stream to the requesting router, which in turn duplicates the multimedia stream (if necessary) and transmits a single stream downstream to the routers and/or the clients requesting such stream. Indeed, each router (as well as the source 100) does not need to transmit more than one multimedia stream to the downstream routers. As such, the bandwidth of the system is utilized more efficiently.

In addition, by using the multicast scheme described above, it is also possible to avoid a transmission of a request for the multimedia stream (that has already been provided to other clients by a particular router) all the way up to the source. For example, another client C10 maybe connected to the fourth router R5, and this new client C10 may request the multimedia stream from the fourth router R4 that has already been requested (and is provided to) the client C1. When the fourth router R4 receives this request from the new client C10, it checks whether the requested multimedia stream has already been provided to it. If not, this request is then passed to the second router R2. If the fourth router R4 determines that the requested multimedia stream is already provided by it to at least one of its clients (is in the present exemplary case to the client C1), the fourth router sends a copy of the requested multimedia stream to the new client C10 without sending additional requests for this multimedia stream to the second router R2, and ultimately to the server.

There are three versions of the Internet Group Management Protocol. The first is found in Appendix 1 of RFC 1112. Version two is found in RFC 2236. Version 3 of the IGMP protocol is found in RFC 3376. Copies of version 1, version 2 and version 3 of the IGMP protocol are found attached hereto as Appendices A, B and C respectively.

A digital subscriber line access multiplexer (DSLAM) allows telephone lines to make faster connections to the Internet. It is a network device, located near the customer's location, that connects multiple customer digital subscriber lines (DSL's) to a high-speed Internet backbone using multiplexing techniques. By locating DSLAM's at locations remote to the telephone company central office, telephone companies are now providing DSL service to consumers who previously did not live close enough for the technology to work. Balanced pair cable has higher attenuation at higher frequencies, hence the longer the wire between the DSLAM and the subscriber, the slower the maximum possible data rate.

Problems of the Prior Art

A digital communications network may deliver a digitized video channels from an IGMP router or proxy (DSLAM) via a network port/interface serving a plurality of IGMP host Internet protocol addresses associated with set top boxes, for example, coupled to associated subscriber terminal devices such as television sets.

A problem sometimes arises, in particularly in large networks, in which a variety of different set top boxes are utilized to connect to user television sets or other subscriber terminal devices. For example, some set top boxes may be compliant only with version 2 of the IGMP protocol. Others may be compliant only with version 1 of the IGMP protocol.

Even when only set top boxes which are labeled as compliant with version 2 of the IGMP protocol are in use, it may be that those boxes either are implemented by different manufacturers which vary somewhat in the degree of rigor with which they comply with the version 2 protocol. Even if strict compliance with a version 2 protocol is advertised for a particular set top box, the actual implementation may be less than the full set of capabilities specified. Also, implementations of various functionality may differ from set top box manufacture to set top box manufacture, which may result in some degree of incompatibility.

Version 2 of the IGMP protocol, specifies a group specific query (channel specific), whereby an IGMP router or proxy (DSLAM) may query the host attached to a network port/interface about whether there are any host served by that network port/interface that are subscribed to a particular channel of multicast communications. When set top boxes or host from different manufacturers are present on the same network, it may be that some of the boxes will not respond appropriately to a channel specific query of version 2 of the IGMP protocol. Alternatively, set top boxes from different manufacturers may respond differently, or in ways that don't permit the IGMP router or proxy to obtain the information it needs to carry out the functioning of the protocols.

As a result, there is a need for insuring that an IGMP router or proxy can obtain the information it desires from all of the hosts resident on the network.

BRIEF SUMMARY OF THE INVENTION

The present invention overcomes the problems of the prior art. Specifically, as described more hereinafter, techniques are described for circumventing a specific query response failure in an IGMP system by utilizing a general query.

The invention is directed to a processing device configured to support an Internet Group Management Protocol (IGMP) for communicating with host devices over a network interface, comprising:

a. an element for sending a channel specific network query to a network over said network interface;

b. an element for checking if each channel listed as connected to a channel group responds to said specific network query; and if not all channels listed as connected to the channel respond, then sending a general network query to the network.

The invention is also directed to a system for distributing information from a source of information to be provided to at least one host device, comprising:

a. a network connecting said source of information to at least one network device providing Internet Group Management Protocol (IGMP) services;

b. the at least one network device having a network interface list and being connected to at least one host device over at least one network interface and configured to send a channel specific network query to a network over said network interface and to check if each channel listed as connected to a channel group responds to said specific network query; and if not all channels listed as connected to the channel respond, then sending a general network query to the network.

The invention is also directed to a method for providing Internet Group Management Protocol (IGMP) services by a network device, comprising the steps of:

a. sending an IGMP group specific query to hosts over a network interface;

b. checking to see if each hosts listed as connected to a particular channel responds to the group specific query; and c. if not all hosts responds, then sending a general network query over the network interface.

The invention is also directed to a computer program product for a network device comprising:

a. a memory medium; and b. computer controlling instructions stored on said memory medium in which said computer controlling instructions comprise instructions for b1. sending an IGMP group specific query to hosts over a network interface;

b2. checking to see if each host listed as connected to a particular channel responds to the group specific query; and b3. if not all hosts responds, then sending a general network query over the network interface.

The invention is also directed to a processing device configured to support an Internet Group Management Protocol (IGMP) for communicating with host devices over a network interface, comprising:

a. an element for selectively sending a channel specific network or a general query to a network over said network interface.

BRIEF DESCRIPTION OF THE DRAWINGS

FIG. 5A shows an exemplary channel-host list in accordance with one aspect of the invention.

FIG. 5B shows the channel-host list of FIG. 5A, modified after host 24 changes from viewing channel 2 to channel 15.

DETAILED DESCRIPTION OF THE INVENTION

Figure 1:
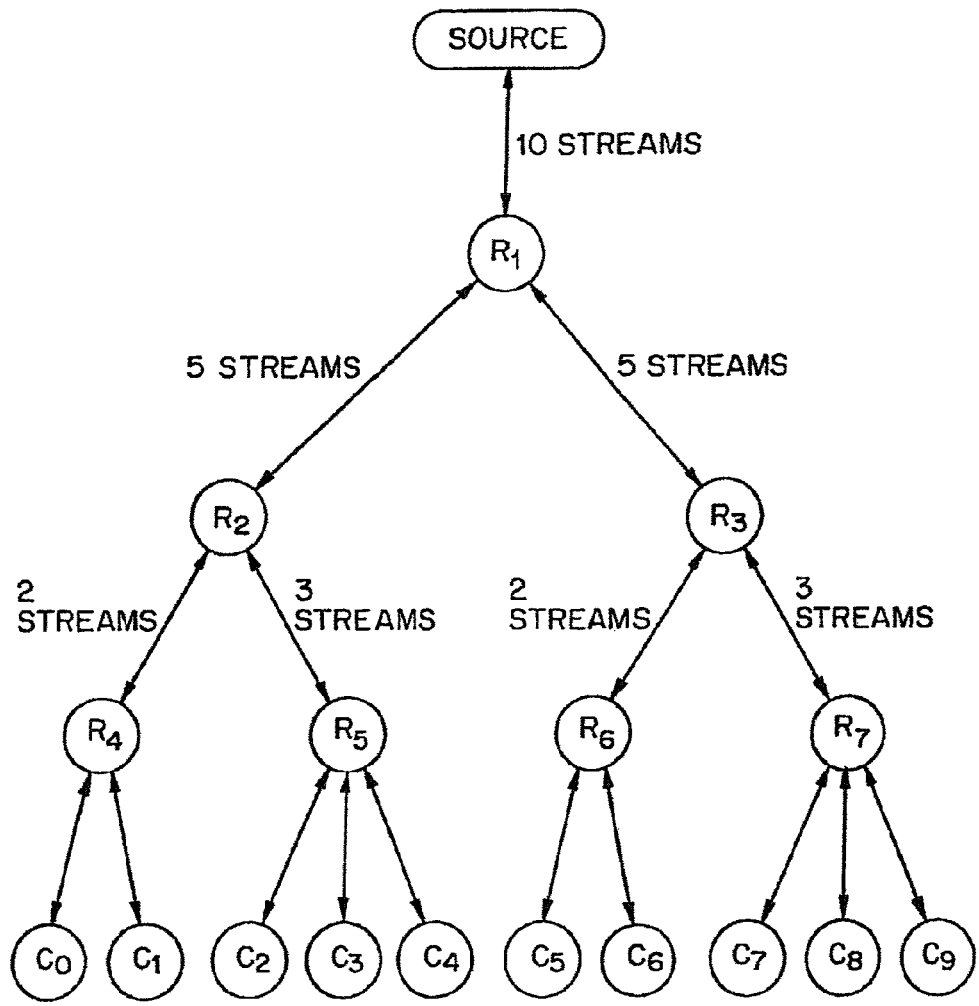
FIG. 1 illustrates a prior art unicast technique for distributing information from an information source such as a video channel to multiple destinations.

As discussed above, FIG. 1 illustrates a prior art unicast technique for distributing an information source such as video channel to multiple destinations.

Figure 2:
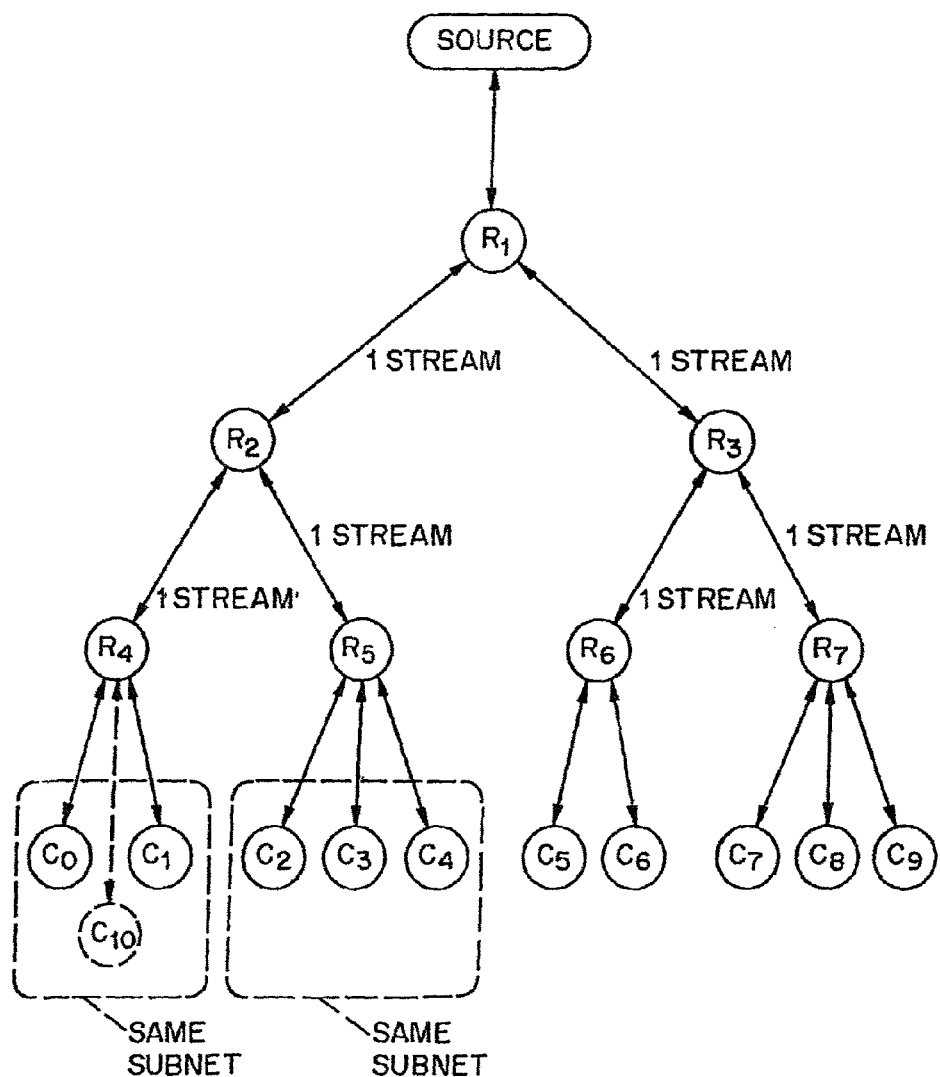
FIG. 2 illustrates a prior art multicast (IGMP) technique for distributing an information source such as a video channel to multiple destinations.

Also as discussed above, FIG. 2 illustrates a prior art multicast (IGMP technique for distributing an information source such as video channel to multiple destinations.

Figure 3:
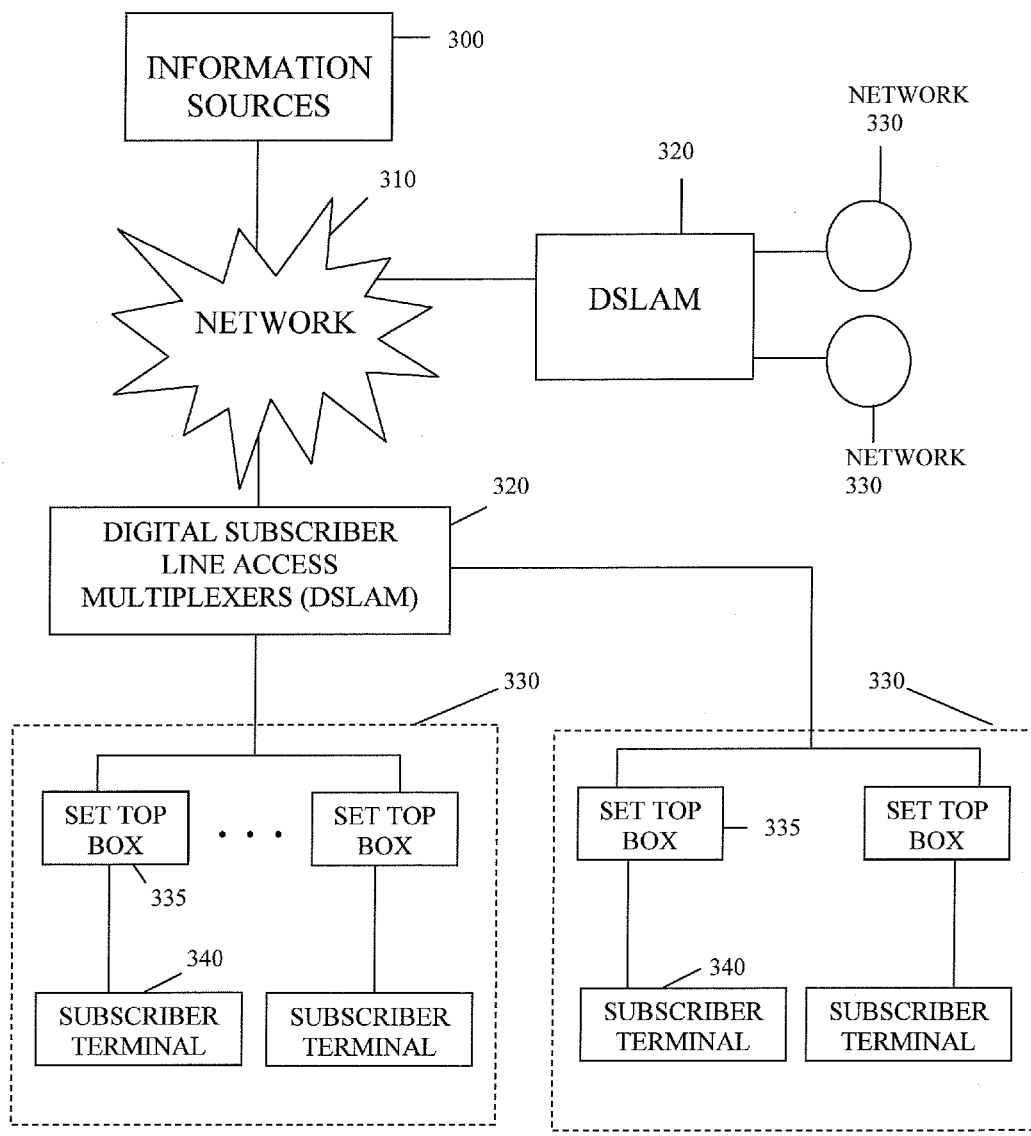
FIG. 3 illustrates a prior art network architecture for delivering information from plural information sources over a network and through an IGMP router or proxy digital subscriber line access multiplexers to network ports servicing a plurality of hosts such as set top boxes.

In the network architecture of FIG. 3, item 300 represents a plurality of information sources, such as a source of plural channels of video information for distribution over a network 310 to digital subscriber line access multiplexers (DSLAM's) 320. Each DSLAM services one or more network ports to which are connected networks 330. The networks include a plurality of hosts, such as set top boxes 335 for receiving selected channels of video information and providing the selected channel of information to a subscriber terminal 340 such as a television set.

Figure 4:
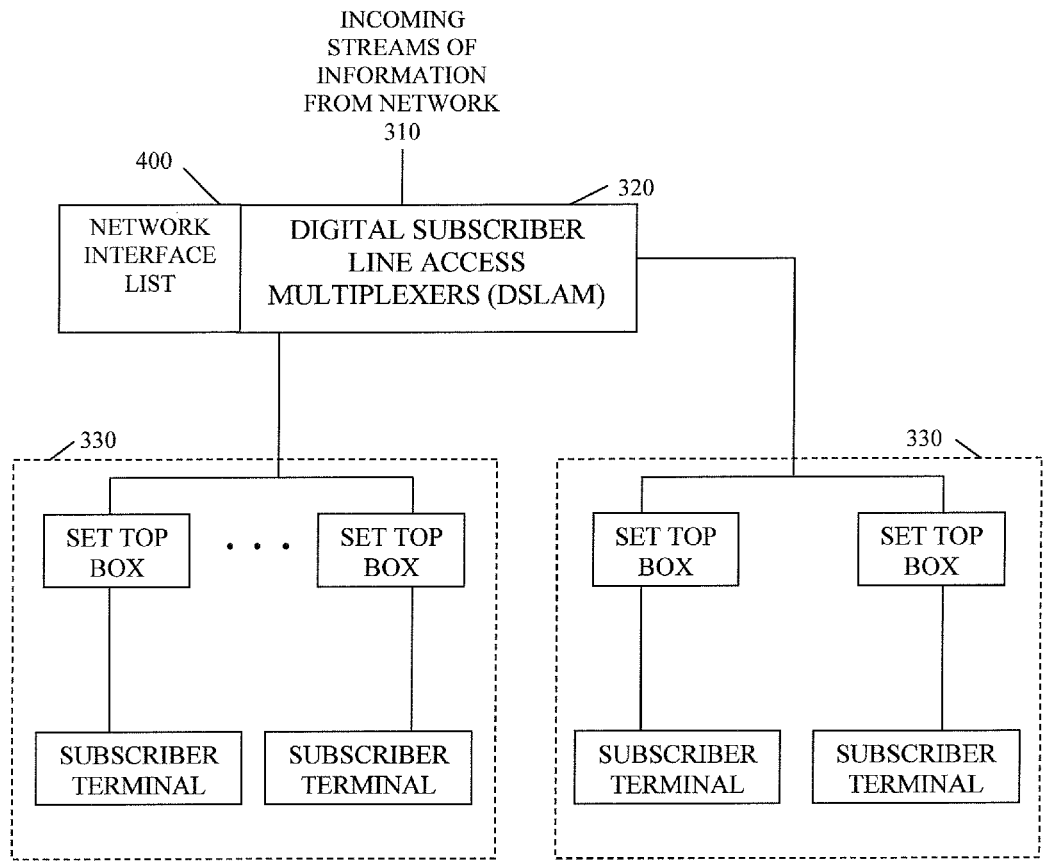
FIG. 4 shows a network architecture in accordance with one aspect of the invention.

FIG. 4 shows a network architecture in accordance with one aspect of the invention which constitutes a portion of the architecture illustrated in FIG. 3. The incoming streams of information from network 310 are received at DSLAM 320. DSLAM 320 then provides selected ones of the information streams from different sources to the network interfaces that it services so that the selected channels of information can be available as needed at the set top boxes. The principal difference between FIG. 4 and FIG. 3 lies in the use of the network interface list 400. The network interface list 400 contains a channel-host list for each of the network interfaces serviced by the DSLAM 320.

FIG. 5A illustrates an exemplary channel-host list in accordance with one aspect of the invention. In FIG. 5A, three hosts are shown watching channel 2, namely host 7, host 24 and host 32. One host, host number 28, is watching channel 15, no other hosts are active on that network. Although the lists as illustrated shows numeric identification for each of the hosts, it maybe preferred to utilize network addresses such as a media access control address, a URL or other identifier for the hosts, and an IGMP group address for the channel.

As set forth in IGMP version 2, when a channel desires to leave a particular channel and switches to another channel, the host will receive a command from a subscriber terminal directing the channel change. For example, if host 24, as shown in FIG. 5A, desired to change from channel 2 to channel 15, the subscriber would utilize the remote control to initiate the transfer at the host set top box 335. The host set top box would then initiate an IGMP leave command directing the DSLAM that host 24 no longer desires to be connected to channel 2. That will be followed in close order, by a join command whereby host 24 desires connection to channel 15. Alternatively, a combined leave/join message could be recognized and acted thereon.

In one form of the prior art, when the channel 2 leave command is sent by host 24, there will be a 2 second delay before the DSLAM stops providing channel 2 information to host 24. During this 2 seconds, host 24 may be already connected to channel 15 which may result in a temporary excess of bandwidth utilization resulting in undesirable pixelized video.

In a second prior art approach, when host 24, request to switch from channel 2 to channel 15, the DSLAM will stop sending channel 2 information at the same time that it starts sending channel 15 information to host 24. In this version, the bandwidth limits are not exceeded, but there is a short-term interruption of programming to hosts 7 and 32 shown in FIGS. 5A and 5B, both of which are watching channel 2. Thus, either the prior art techniques for switching the sources to a host may result in undesirable adverse effects.

Both of these problems described in the preceding two paragraphs are solved by using the techniques of the invention described in provisional application No. 60/867,635 which is now U.S. patent application Ser. No. 11/947,355 filed Nov. 29, 2007, by inventor Jared Lee Bell. This technique utilizes a channel-host list appropriate for the network which is found within the network interface list 400 shown in FIG. 4. Specifically, upon receiving a leave request, the DSLAM will check the list of hosts connected to channel 2. If no other hosts are connected to the channel 2 group, then the immediate leave technique of the prior art will be executed. If there are in fact other hosts connected to the channel 2 group as reflected in the channel-host list, then the DSLAM will continue sending the channel 2 group to the network. Then, the join request for, in this example, host 24 to receive information from channel 15 will be executed. Paragraph 6 in the provisional application Ser. No. 60/867,635 that is identified above discusses the additional benefit and function of bandwidth analysis with regard to dropping and not dropping the host, e.g., multicast group. Although this may temporarily produce pixelized video, bandwidth oversubscription, etc. it will avoid dropping the to-be-dropped multicast group to other IGMP Host IP addresses currently using it—hence, the phrase "smart" immediate leave. In a non-limiting implementation, bandwidth analysis may be conducted to determine how much bandwidth is available to handle the newly added multicast group along with the still used multicast group (s).

When host 24 sends an IGMP leave command indicating it desires to leave the channel 2 IGMP group, it will be received by the DSLAM or proxy. The DSLAM or proxy needs to know if there are other hosts subscribed to the channel 2 multicast group. Using IGMP version 2, the host would normally send an IGMP group specific query inquiring of the hosts connected to the network interface to report whether or not they are connected to channel 2. If each of the hosts connected to the network had fully and properly implemented version 2 of the IGMP protocol, each host would then respond if it were connected to the channel 2 multicast group. However, a number of problems can keep that from happening. Specifically, if the network includes hosts that are only version 1 compatible, they will not recognize IGMP group specific query. That query was not part of IGMP version 1. Rather, it was introduced in IGMP version 2. Further, even if all of the hosts on the network serviced by the network interface were advertised as IGMP version 2 compatible, the functionality for implementing the IGMP group specific query may not have been implemented as part of the implementation used by a specific manufacturer. Therefore, the host may not properly report when receiving an IGMP group specific query. It may also be the case that a particular manufacturer did implement the IGMP group specific query, but did so in a way that is incompatible with the implementation utilized by the router or DSLAM proxy.

Any of these circumstances might cause a host on a network to fail to respond to an IGMP group specific query.

Figure 6:
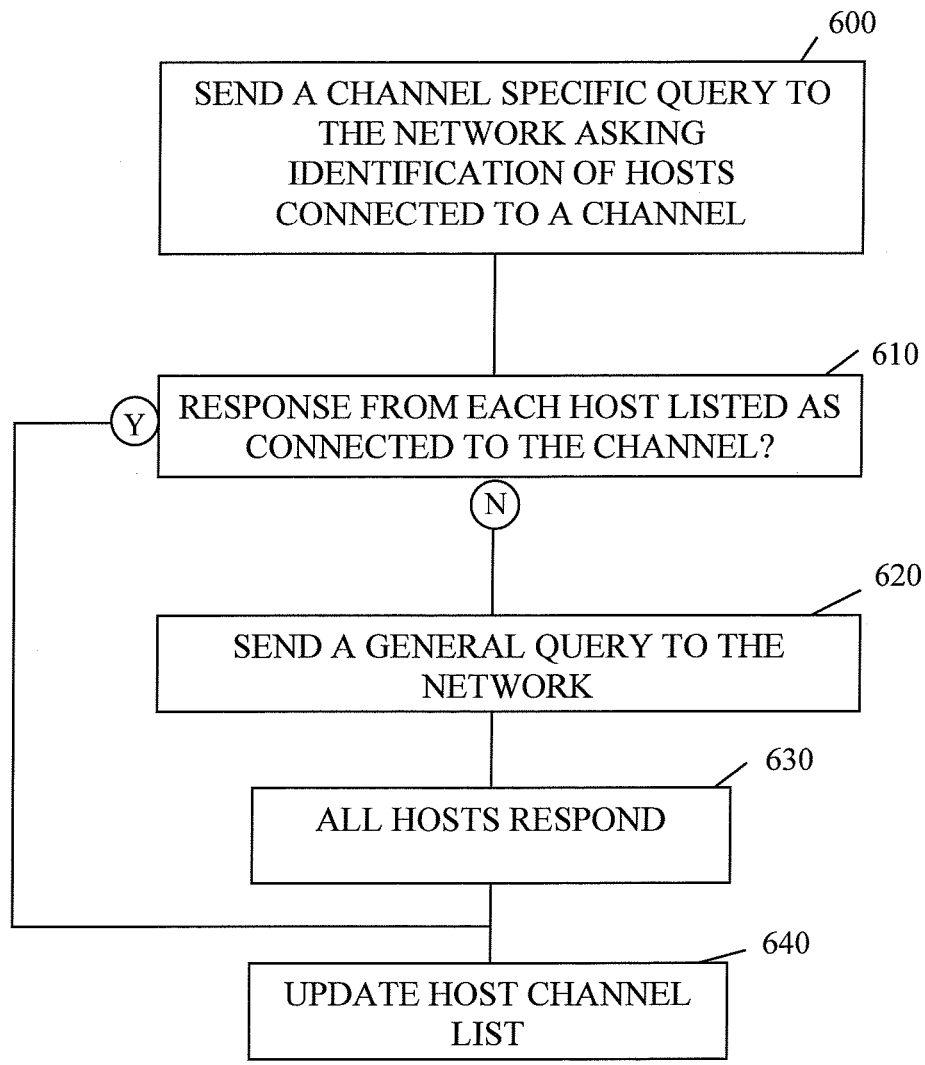
FIG. 6 is a flow chart of a technique for circumventing a specific query response failure in accordance with one aspect of the invention.

FIG. 6 is a flow chart of a technique for circumventing a specific query response failure in accordance with one aspect of the invention.

The technique of FIG. 6 can be utilized whenever a router or proxy needs knowledge of the status of host connected to a channel on a particular network. Such a circumstance might occur when the proxy or the router receives a leave command on a network associated with the proxy or router. When the proxy or router has the need to know the status of host with respect to a particular channel, the host or router would normally send a channel specific query to the network asking identification of hosts that are connected to a particular channel (600). The proxy or router then checks to see if a response has been received from each host listed as connected to the channel (610). If it has a response from each host listed as connected to the channel (610—Y), the host or router will jump to step 640 and update the host-channel list accordingly. If however, responses are not received from each host listed as connected to the channel (610—N) the host or router will send a general query to the network 620 asking all hosts on the network to report all channels to which they are connected. All hosts will then respond (630) and the host channel list will be updated for the host connected to the network over that network interface.

Thus, even if one of the hosts fails to respond to a version 2 channel specific query, that response failure can be overcome by the use of a general query to the network. In this way, a failure to respond to a channel specific query can be overcome.

Figure 7:
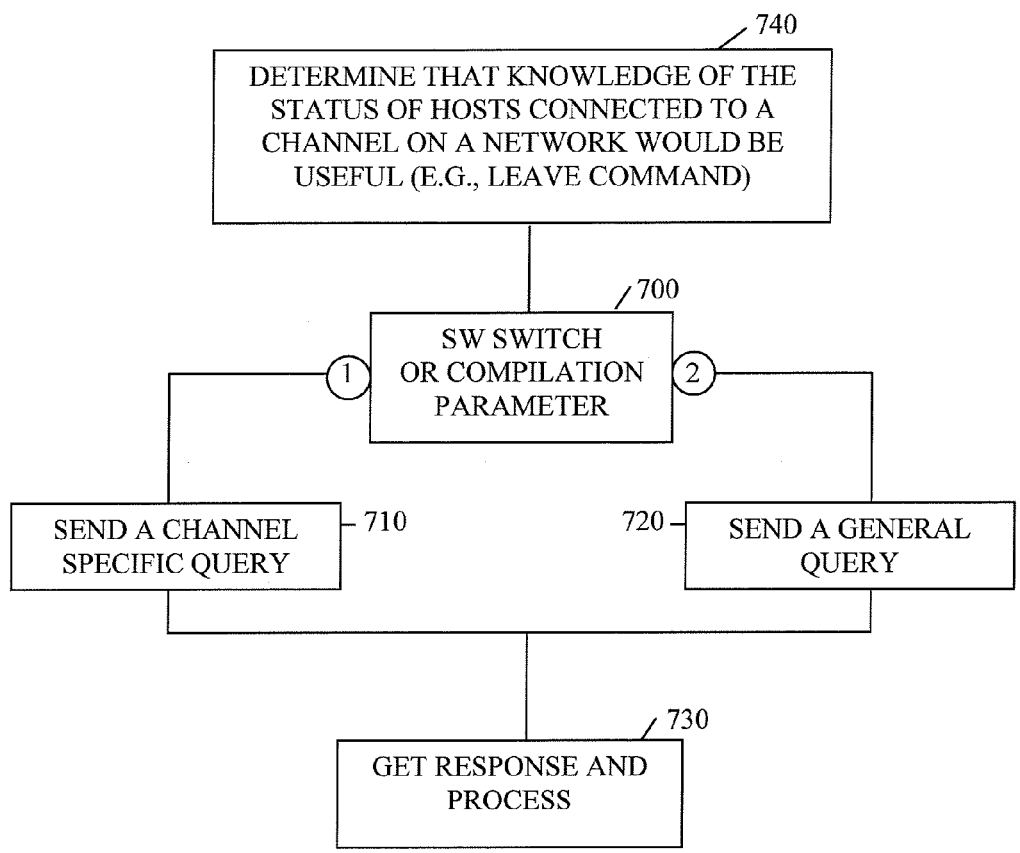
FIG. 7 is a flow chart of a process of implementing an IGMP protocol on a router or proxy.

FIG. 7 is a flow chart of a process of implementing an IGMP protocol on a router or proxy. In the technique shown in FIG. 7, the implementation of the IGMP protocols are expanded by allowing an IGMP router or proxy to be selectively controlled to utilize either the channel specific query 710 or a general query 720. The selection can be made using a hardware switch, a software switch, a compilation parameter or an express command (700). If one knows that one is operating in a heterogeneous environment, where the likelihoods are high that some host will not manage properly a channel specific query, then one could set the software switch 700 to send the general query 720 in all instances. Alternatively a specific configuration parameter set during compilation of the IGMP software on the proxy or the router. Alternatively, the software switch can be commanded by a network administrator to select one or the other of the modes. Regardless of which mode is selected, once the response to a channel specific query or general query has been received, the response will be processed to result in a correct response to the query permitting full use of the particular IGMP protocol version in use.

The specific formats for the message exchange between the host terminals and the DSLAM's are set forth in the IGMP versions 1, 2 and 3 attached hereto as Appendix A, Appendix B and Appendix C, respectively.

While various embodiments of the present invention have been illustrated herein in detail, it should be apparent that modifications and adaptations to those embodiments may occur to those skilled in the art without departing from the scope of the present invention as set forth in the following claims.

What is claimed:

1. A communications system, comprising:
a plurality of set top boxes (STBs) each having an Internet Group Management Protocol (IGMP) host IP address;
a digital subscriber line access multiplexer (DSLAM) configured to receive network data from a communications network and comprising,
a network port connected to each of the STBs and configured to provide an IGMP channel to the STBs over which network data is delivered, and
a network interface list indicative of which STBs are connected to the IGMP channel,
wherein the DSLAM is configured to send a channel specific query over said IGMP channel to the STBs listed as connected to the channel, and if each STB as listed on the network interface list responds, the network interface list is updated, and
if responses are not received from each STB listed as connected, the DSLAM is configured to send a general query and when each STB responds, the network interface list is updated,
and wherein during a channel change request from a STB, the network device is configured to drop the IGMP channel when the updated network interface list indicates there are no other STBs connected to the IGMP channel and if there is still at least one STB connected to the network port and IGMP channel, continue providing the IGMP channel,
and wherein the DSLAM is selectively controlled to send a general query when the DSLAM determines that there is at least a specified likelihood that a STB will not manage properly a channel specific query.

2. The communications system according to claim 1, wherein said DSLAM is configured to determine available bandwidth, and if bandwidth is available, continue providing the IGMP channel.

3. The communications system according to claim 2, wherein said DSLAM is configured to determine available subscription bandwidth demand.

4. The communications system according to claim 1, wherein each STB is configured to receive video data.

5. The communications system according to claim 1, wherein said STBs are configured together as multicast group.

6. The communications system according to claim 1, wherein said DSLAM is configured to generate a IGMP query at a user configurable frequency to determine if any STBs are still connected as a multicast group.

7. A method for providing Internet Group Management Protocol (IGMP) services, comprising:
receiving network data within a digital subscriber line access multiplexer (DSLAM) from a communications network;
delivering the network data to a plurality of set top boxes (STBs), each having an Internet Group Management Protocol (IGMP) host IP address, via an IGMP channel provided by the DSLAM to the STBs;
sending from the DSLAM a channel specific query over the IGMP channel to STBs listed as connected to the channel as listed on a network interface list of the DSLAM, and if each STB as listed on the network interface list responds, updating the network interface list;
if responses are not received from each STB listed as connected, sending a general query, and when each STB responds, updating the network interface list;
during a channel change request from a STB, dropping the IGMP channel when the network interface list indicates there are no other STBs connected to the IGMP channel, and if there is at least one STB still connected to the network port and IGMP channel, continue providing the IGMP channel; and
selectively controlling the DSLAM to send a general query when the DSLAM determines that there is at least a specified likelihood that a STB will not manage properly a channel specific query.

8. The method according to claim 7, and further comprising determining available bandwidth, and if bandwidth is available, continue providing the IGMP channel.

9. The method according to claim 8, wherein the determining available bandwidth comprises determining available subscription bandwidth demand.

10. The method according to claim 7, and further comprising configuring the STBs together as a multicast group.

11. The method according to claim 7, and further comprising generating an IGMP query at a user configurable frequency to determine if any STBs host devices are still connected as a multicast group.

12. A communications device, comprising:
a communications port configured to receive network data from a communications network;
a digital subscriber line access multiplexer (DSLAM) network port configured to connect to a plurality of set to boxes (STBs), each having an Internet Group Management Protocol (IGMP) host IP address, and provide an IGMP channel to the STBs over which network data is delivered;
a network interface list indicative of which STBs are joined to the IGMP channel;
wherein the DSLAM network port is configured to send a channel specific query over said IGMP channel to the STBs listed as connected to the IGMP channel, and if each STB responds, the network interface list is updated;
if responses are not received from each STB listed as connected, the DSLAM network port is configured to send a general query, and when each STB responds, the network interface list is updated; and
wherein during a channel change request from a STB, the DSLAM network port is configured to drop the IGMP channel when the updated network interface list indicates there are no other STBs connected to the IGMP channel, and if there is still at least one STB connected to the network port and IGMP channel, continue providing the IGMP channel;
and wherein the DSLAM network port is selectively controlled to send the general Query when the DSLAM network port determines a high likelihood that a STB will not manage properly a channel specific query.

13. The communications device according to claim 12, wherein said DSLAM network port is configured to determine available bandwidth, and if bandwidth is available, continue providing the IGMP channel.

14. The communications device according to claim 13, wherein said DSLAM network port is configured to determine available subscription bandwidth demand.

15. The communications device according to claim 12, wherein each set top box is configured to receive video data.

16. The communications device according to claim 12, wherein said DSLAM network port is configured to determine available subscription bandwidth demand.

17. The communications device according to claim 12, wherein any STBs are configured together as multicast group.

* * * * *

UNITED STATES PATENT AND TRADEMARK OFFICE
CERTIFICATE OF CORRECTION

| | | |
|---|---|---|
| PATENT NO. | : 8,874,796 B1 | Page 1 of 1 |
| APPLICATION NO. | : 11/947560 | |
| DATED | : October 28, 2014 | |
| INVENTOR(S) | : Jared Lee Bell et al. | |

It is certified that error appears in the above-identified patent and that said Letters Patent is hereby corrected as shown below:

On Title Page, In Column 2 (Abstract), In Line 4, Delete "heterogenous" and insert -- heterogeneous --, therefor.

In the Claims

In Column 10, In Line 3, In Claim 11, after "STBs" delete "host devices".

In Column 10, In Line 10 (approx.), In Claim 12, delete "to" and insert -- top --, therefor.

Signed and Sealed this
Eighteenth Day of August, 2015

Michelle K. Lee
*Director of the United States Patent and Trademark Office*